Fig. 3

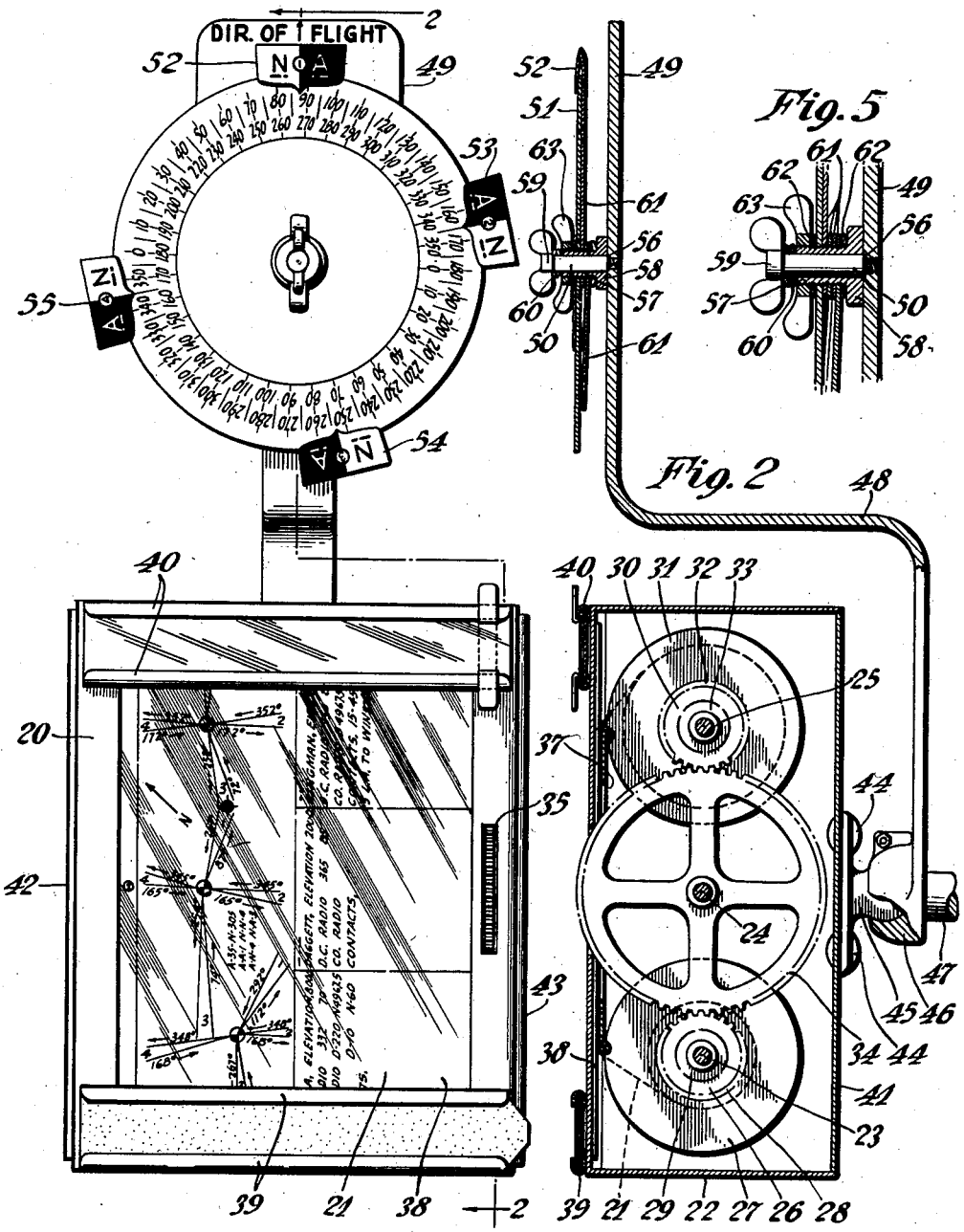
Nov. 29, 1938.  T. E. HALPIN  2,138,422
INDICATING INSTRUMENT FOR NAVIGATION
Filed Jan. 28, 1935  3 Sheets-Sheet 1
Inventor
Thomas E. Halpin
By Raymond W. Colton
Attorney Nov. 29, 1938.    T. E. HALPIN    2,138,422
INDICATING INSTRUMENT FOR NAVIGATION
Filed Jan. 28, 1935    3 Sheets-Sheet 2

AIRWAY-AID CO-ORDINATOR
INDEX
INTERNATIONAL MORSE CODE
A ·—    N —·    1 ·————
B —···   O ———   2 ··———

RADIO RANGE BEACONS
ALPHABETICALLY SHOWN
Route-Location--Fre.--Iden.Sigs.-Dial
2-3  Fontana Cal. 332   ·—·   70
2    Kingman Ar. 365    —·—   85

RADIO MARKER BEACONS
Radio marker beacons operate---etc.
Answers to calls from aircraft on 278··
Class "A"(Non-directive) Marker Beacons
Route Location   Fre.  Iden.Sigs  Dial
2-3  Fontana Cal. 332   ·—·   70

Class "B" Min Radio Range(Equip)Marker Beac'n

Listening Watch Maintained on Air··Etc.
Route Location   Fre.     Dial
  2  Daggett Cal. 365      85

Reg. Broadcasting Sta's. By Identification
Plus No. Marker Beacons & Cl."B" Range Equip.
   Location    /  Fre.    Dial
/·· Kingman Ariz.  350     80
K—·Daggett Calif.  365     85

Multiple  Iden.  Signals
—··,·—·  Bellefonte, Pa  224   10

Add. List of Stas. Equip'd For Voice
Communication With Aircraft
Location     Fre.    Dial
Acomite, N.M.  278    30

Winds Aloft Broadcast
Kingman
L.A.(Burbank)   7:05   6:05
L.A.(Sandburg)  7:00   6:00

Route  Forecast
Route Broadcasts Are Made
Following The 30min. After-Etc.
Location    Forecasts   Dial
Kingman    L.A. to Winslow Route  Identification
Route Iden. Nos. 1 to 6 incl.
Will Iden. Routes East & West
7 to 10  North & South
Route 1-- No. Transcontinental
      Route & Feeders

Fig. 4

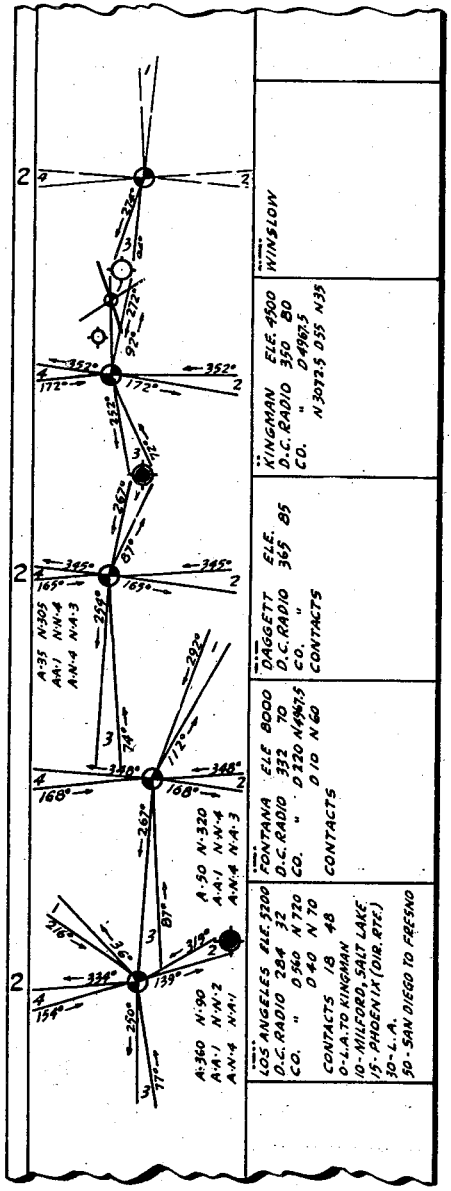

Inventor
Thomas E. Halpin
By Raymond Wooton
       Attorney

Nov. 29, 1938.　　　T. E. HALPIN　　　2,138,422
INDICATING INSTRUMENT FOR NAVIGATION
Filed Jan. 28, 1935　　3 Sheets-Sheet 3

Inventor
Thomas E. Halpin
By Raymond W. Colton
Attorney

Patented Nov. 29, 1938

2,138,422

UNITED STATES PATENT OFFICE 2,138,422

INDICATING INSTRUMENT FOR NAVIGATION

Thomas E. Halpin, Washington, D. C.

Application January 28, 1935, Serial No. 3,887

8 Claims. (Cl. 116—133)

The present invention relates to an indicating instrument adaptable to general use, but primarily intended to serve in conjunction with radio range beacons in the navigation of aircraft.

Heretofore, pilots have been forced to rely upon their own resources to a large extent, in the accumulation of various maps, data, etc., concerned with instrument flying. Consequently, no two pilots having the same tools, practice has not been standardized and the interests of safety have not been fully served. The rapid advances in aviation, are attended by increasing needs for safety equipment and labor saving devices to aid pilots in the maneuvers. It is in the province of "blind" or instrument flying, that these needs have been least fulfilled.

The Aeronautics Branch of the United States Department of Commerce inaugurated, a few years ago, a system of radio range beacons for assisting pilots in following their courses. The operation of this system and the manner in which it is utilized, is ably described in General Airway Information, Airway Bulletin No. 1 of September 1, 1932; and Air Commerce Bulletin, vol. 4, No. 6, of September 15, 1932; both published by the Aeronautics Branch of the U. S. Department of Commerce.

These publications outline the details of the beacon system, giving the beacon locations, range bearings, wave lengths of the transmitters at the respective stations, station identification signals, time schedule for broadcasts, etc. In addition, several systems by which the pilot may solve his problem of position are outlined, to any of which, the present invention is readily applied.

Instrument flying becomes a necessity under the adverse weather conditions encountered during fog and storm, at which times, the routine operations of flying in favorable weather, become complicated and hazardous, demanding the full attention of even the ablest pilot. Such conditions coupled with the responsibility of commercial pilots of delivering the passengers or cargo safely to their destination, calls for equipment which will relieve the pilot of all possible mental labor and danger of error involved in solving mathematical problems of navigation. Then too, there are many pilots whose scholastic training has not prepared them for the trigonometric computations necessary for carrying out the procedures set forth in the publications referred to above. Moreover, the solving of these problems often requires the utmost speed, a factor which becomes increasingly important as higher flying speeds are developed.

In the interests of aviation and for lightening the burdens imposed upon his fellow pilots, applicant has conceived and produced an apparatus, the operation of which: simplifies certain phases of the problems encountered in blind flying; reduces the possibility of errors to a minimum; and increases the speed of solving such problems.

Generally, the present construction comprises a map displaying a sequence of geographical points, with the various aids to navigation depicted thereon. The map is supported by a casing, and what may be called an adjustable coordinator, is supported in a position for ready cooperation with the map.

The preferred embodiment comprises a strip map bearing the desired indicia, mounted in a casing wherein it may be shifted by suitable means to expose any of the stations depicted thereupon. Supported in cooperative relation with the map and casing, there is preferably a table having a reference point inscribed thereon, with a protractor-like plate, graduated in degrees over its full circumference. The plate is adjustably carried by the table, in order that a graduation of the former may be set to correspond with the reference point of the latter. A plurality of indicators are adjustably mounted with respect to the plate, for correspondence with any of the plate graduations, the number of such indicators being preferably such as will correspond with the number of beams emitted from a beacon as shown on the map. These indicators are provided with distinguishing identification and each has its edges contrastingly marked, the indicators being arranged in such order that like edges of sequential indicators are adjacently disposed. Adjustable means is also contemplated, for indicating the positions of landing fields relative to the radio range beacons, in which case provision may be made for representing the portable transmitting stations described in the U. S. Department of Commerce "Air Commerce Bulletin" November 15, 1934, page 108.

It is an object of the present invention therefore, to provide a device having the general aforementioned characteristics, which is inexpensive to manufacture, simple to operate, positive in its action, and above all, instrumental in rendering certain phases of aeronautics less hazardous to pilot and passengers alike.

The following discussion will bring out additional objects inherent to the invention, which will be evident when considered in connection with the accompanying drawings.

Fig. 1 is a plan view of the device showing a strip map and its housing combined with a coordinator;

Fig. 2 is a section taken along line 2—2 of Fig. 1;

Fig. 3 is a fragmentary plan of portions of a proposed strip;

Fig. 4 is a section of the map showing the accompanying data;

Fig. 5 is an enlarged sectional view of a portion of the coordinator;

Figure 6:
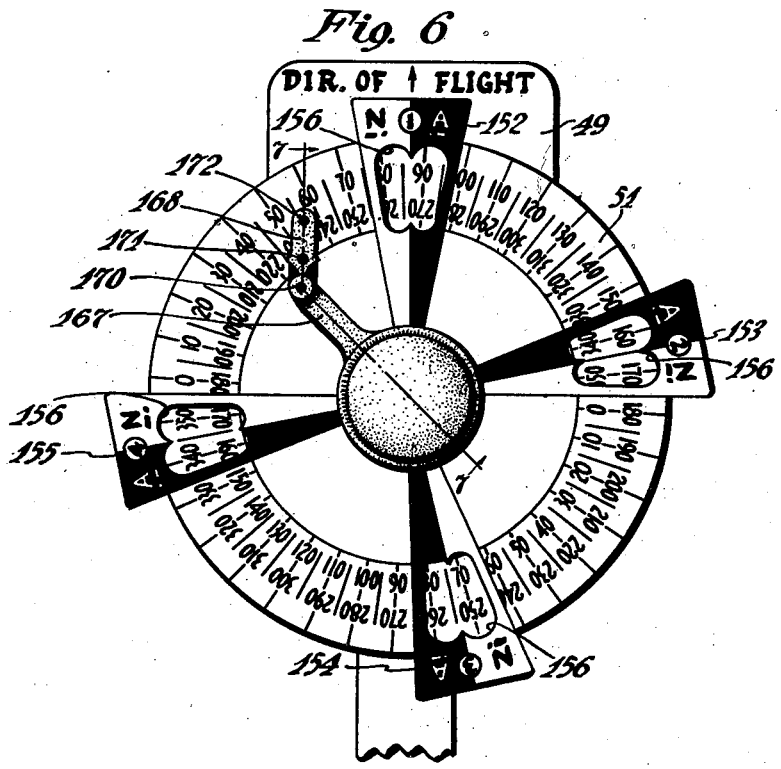
Fig. 6 is a plan view of a modified form of coordinator.

A housing 20 containing suitable reeling mechanism, supports a printed strip 21 bearing a map together with other desired information. The housing may assume the form of two sections, a supporting section and a supported section, assembled in the form of a box. The supported section 22 may itself be essentially a box having an open base. Journalled in the side walls of the supporting section 41 are the shafts 23, 24 and 25 of the reeling mechanism.

One of the shafts 23 supports a reel 26 having flanges 27 at either end. A pinion 28 may be fastened to the shaft 23 directly or through an overrunning clutch 29. The other real shaft 25 is similarly arranged with respect to its reel 30, flanges 31, pinion 32 and clutch 33. In constant mesh with the pinions 28 and 32, there is a drive gear 34 mounted upon the third shaft 24. A portion of this drive gear may project through a slot 35 formed in the supported section so as to be operable from the outside by the hand of the user.

The strip map has its ends suitably attached to the reels, and passes over a table 37 supported by the side walls of the supporting section 41, so as to present a flat aspect over a desired length. A window 38 is provided in the supported section, which window may be glazed or provided with transparent protecting material of any kind. The marginal portions of the supported section may be provided with channelling 39, 40, into which memorandum pads, cards or other writing surfaces may be inserted for bearing supplementary data. Similarly, channelling 42, 43, may be provided on the side walls for the reception of maps and other data.

The supporting section 41 of the housing comprises a base plate having normal thereto, the side walls already referred to. It is received within and supports the supported section. Attached to the base of the supporting section, as by rivets 44, is an attaching element 45 for adjustable assembly with a second element 46 which may be fixed in the cockpit of an aeroplane, or which may have a shank 47 detachably received in a member fixed to the floor, dashboard, etc. The elements 45 and 46 are depicted as ball and socket elements respectively whereby universal movement of parts is obtainable. The socket is depicted as split and adjustable upon the ball by a nut and bolt. Other joints productive of similar effects may be substituted for the type illustrated.

Projecting from the socket element, there is an angular supporting member 48, terminating in a table 49 which assumes a position such as to be viewed simultaneously with the map. At this point it will be noted that the map housing and table 49 are shown as relatively adjustable, being so spaced that one may completely revolve about its axis without being obstructed by the other.

Threadedly received by the table 49, there is a pin 50 which serves as a pivot for a plate 51 and a plurality of indicators 52, 53, 54, 55. The pin is provided with a shoulder 56 for limiting its entry into the table. A sleeve 57 is journalled upon the pin, a flange 58 of the sleeve bearing upon the table. Between the upper end of the sleeve and the head 59 of the pin, a pair of frustro-conical resilient washers 60 are interposed for the purpose of providing a braking effect upon rotation of the sleeve. As the pin is threaded into the table, these washers will be pressed together and flattened, increasing the required torque for turning the sleeve. In the form shown, the indicators are provided with arms 61 which are journalled on the sleeve, and the plate 51 is likewise journalled thereupon. Frustro-conical resilient washers 62 are also provided between the arms 61 and the flange 58 of the sleeve and directly above the plate 51 for adjusting the resistance to turning of the plate and indicators by loosening and tightening of a nut 63 threadedly received upon the upper end of the sleeve. It will be obvious that loosening of the nut 63 will permit ready relative adjustment of the indicators and plate, while tightening the nut will prevent such relative movement. For practical operation, both the pin and nut will be adjusted to a point such that the plate and indicators may be adjusted without causing movement of the sleeve, whereupon the system as a whole may be oriented without disturbing the relative settings.

The information carried on the printed strip may vary to suit different requirements, the only portion in direct cooperation with the co-ordinator constituted by the table 49, plate 51, arms 52, 53, 54, 55, being that typified in Fig. 4 of the drawings.

As an introduction to the map itself, brief reference is made to the auxiliary data fragmentarily shown in Fig. 3. Specimens have been taken from the various sections of the strip to show: the Morse code; an alphabetical list of radio range beacons, their frequencies, identification signals and corresponding dial settings for their reception as well as route identification; a list of Class A marker beacons; a list of Class B beacons; broadcasting stations in accordance with their identification signals; a list of stations having multiple identification signals; a list of stations having equipment for voice communication; broadcast schedule for winds aloft; schedule of weather forecasts; route identification; and finally the map itself.

A typical section of the strip map is depicted in Fig. 4, where it will be noted that for facility in reading the accompanying printing, the latter is arranged in lines parallel to the length of the strip. Consequently, the housing may be turned so that either reel is remote from the observer without necessitating an adjustment or requiring undue difficulty for reading the data.

The map section shows a route comprising Los Angeles, Fontana, Daggett and Kingman. The beacons are depicted as alternate shaded and unshaded sectors representing the "A" and "N" quadrants, so-called, respectively. This identification is based upon the hypothesis that a line through a beacon, directed towards true north, will always intercept an N quadrant; in the event that such a line coincides with a leg of the beacon, then the N quadrant is to the left or north-west.

The angular bearings towards and away from the beacons, for all four legs thereof are clearly marked. The legs are also identified by numerals from 1 to 4 to correspond with the similarly numbered indicators 52, 53, 54 and 55 respectively. It will also be noted that opposite edges of the indicators are shaded and unshaded respectively to designate alternate sectors like those of the beacons. Indicator 52, also denoted by the numeral 1 to correspond with the map indicia, will according to the above hypothesis, always be the first one in a clockwise direction from a diameter passing through the zero mark on the plate, or will coincide with such diameter. The remaining indicators will lie in the order of their numerals in a clockwise direction.

For each beacon on the map, there are accompanying directions, typified by that for Daggett and shown in Figs. 1 and 4. These directions for Daggett are as follows, based upon one of the accepted methods of orientation:

```
A—35        N—305
A—A—1       N—N—4
A—N—4       N—A—3
```

Interpreted, these symbols indicate to a pilot approaching Daggett, that upon hearing the "A" signal or Morse code dot dash, he should steer a course of 35°. This course is maintained until a beacon leg is intercepted, readily recognized by its characteristic "T" or Morse code dash, whereupon the pilot makes a 90° turn to the right. If the new signal is an "A", the leg intercepted was that numbered 1, symbolized by the abbreviation A—A—1. Similarly, if the new signal is an "N", then he would steer 305° until a beacon leg is intercepted, then make a 90° turn to the right and listen for the new signal. An "N" would indicate that leg 4 had been intercepted, while an "A" would indicate leg 3; this information is disclosed by the symbols N—N—4 and N—A—3, respectively.

The course to be steered upon hearing an initial signal is computed as the bisector or approximate bisector of a pair of adjacent legs of the particular beacon. The bearing of leg 1 of Daggett is 267° and of leg 2 is 345°. The bisector is then roughly 305° which course is steered upon reception of the "N" signal. The course to be assumed upon the reception of the "A" signal is along a line disposed at right angles to the computed bisector, or in the case of Daggett, 35°. While the true bisector for Daggett is 306°, numbers divisible by five have been used in the interests of simplicity.

Now assuming that a pilot flying from Los Angeles on the airway shown in Fig. 4, towards Kingman, hears the Daggett identification signal dash-dot-dash. Desiring to orient himself and learn his position, the pilot will adjust the zero of plate 51 to coincide with the bench mark or direction of flight arrow of the table 49. Then he will set the indicators 52, 53, 54 and 55 to their angular positions on the plate to correspond with the bearings disclosed for the Daggett beacon legs 1, 2, 3 and 4 respectively. Then, since the direction of flight is supposedly towards Kingman, leg 52 will be made to register with the bench mark by turning the plate and indicators as a unit about their common pivot. This condition is depicted in Figs. 1 and 6. From the predominating signal accompanying the Daggett identification, the pilot determines his relative position.

Assuming the pilot has heard the "N" signal he is not "on-course." He will refer to the directions on the map, and steer a course of 305° until the "on-course" signal is heard. Then after a 90° turn to the right, assuming he again hears the "N" signal, he will know that he has just contacted leg 4. He can then return to leg 4, turning the plate and indicators as a unit until indicator 55 is towards him, maintaining an "on-course" direction until the dead-spot over the beacon is reached, whereupon, a turn to the left along a course of 87° puts the plane on leg 1 towards Kingman. The plate and indicators will now be returned to their position as shown in Fig. 1. It will follow that the indicators will be shifted to correspond with the Kingman beacon leg bearings when the pilot approaches the latter beacon. Accordingly, the coordinator will be reset to correspond with the sequential beacons along the route, as their signals become sufficiently strong to be used as the new basis for direction.

Figure 7:
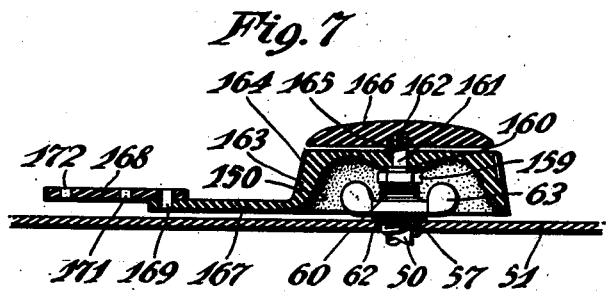
Fig. 7 is an elevation partly in section along the line 7—7 of Fig. 6.

A modification of the coordinator is shown in Figs. 6 and 7. The plate 51 is adjustably supported upon the threaded sleeve 57, which, as in the former case, rests upon the table 49 and is journalled upon the pin 50 which is threaded into the table 49. In this case, the pin 50 is shown as having a polygonal head 159 integral therewith, above which is provided a shoulder 160 and a reduced end 161 terminating in threads 162. An adjustment nut 63 is provided as in the first case.

Rotatably received upon the shoulder 160 and the reduced end 161 of the pin 50, there is a knob 163 of substantially frustro-conical shape, having a hollow portion 150 for housing the adjusting elements. The outer surface of the knob is knurled as at 164 in order that it may be readily gripped. The upper surface of the knob is shown as counterbored for the reception of a spring 165, the opposite end of which is received in a counterbore formed in a cap member 166 which is screwed upon the threads 162. This spring tends to prevent unintended movement of the knob. Both the knob and cap member may be formed of condensation resins or other suitable material.

The knob 163 may be provided with a projecting finger or pointer 167, shown as integral therewith, upon which an arm 168 is pivoted at 169 for full rotation if desired. An indication 170 carried by the finger or the head of the pivot, is intended to represent a landing field, the position of which may be set with respect to the radio range beacons so as to conform with its actual location. Indications 171 and 172 are provided on the arm 168 to represent the portable transmitting stations described in the Air Commerce Bulletin of November 15, 1934.

The plate 51 in the modification is inscribed with two sets of angular graduations displaced by 180° as before, in this case however, the outer graduations are erect at the top of the plate, the inner set being erect at the bottom of the plate. The angular bearing into a radio range beacon is read at the bottom of the plate or on the inner circle, while the angular bearing out from a radio range beacon is read at the top of the plate or on the outer circle.

The indicators 152, 153, 154 and 155 are formed from flat sheet material and are adjustable about the periphery of the graduated plate 51. These indicators may be pivoted below the plate 51 as described with reference to Figs. 2 and 5, above the plate, or they may be adjustably mounted with respect to the plate in any other manner, for example, by a suitable spring clip. The indicia borne by these indicators is comparable with that shown in Fig. 1, but the indicators in this case extend towards the center of the plate in a convergent manner, and cut-out portions 156 are provided so that the indicators may be accurately set with respect to the graduations carried by the plate. It will be noted that opposite edges of each indicator are contrastingly marked, and that similarly marked edges of contiguous indicators are in adjacency. The divergence of these indicators, regarded from the center of the plate, is highly suggestive of the beam divergence of the radio range beacons as shown by the map, thus further aiding the pilot or navigator in his manipulations.

The operation of the modified indicators is similar to the method already described. In utilizing the landing field pointer and its pivoted arm, the knob 163 will be turned until the indication 170 denotes the position of the landing field relative to the beacon. Then after a determination of the direction of a line through the portable transmitters represented by the indications 171 and 172, the arm 168 is set to the corresponding angle and the landing conditions to be observed will be graphically portrayed before the pilot, and he will not be required to depend upon his memory or sense of direction to a great extent.

The apparatus described in the foregoing is intended to be illustrative, but not necessarily restrictive, as it is well within the scope of the present invention to modify the construction in various ways to produce the same results. The protection sought is expressed in the following claims.

I claim:

1. An indicating instrument for navigation comprising a support, a pivot secured to said support, a member pivotally mounted upon said pivot and having an angularly calibrated surface so positioned with respect to said support that said surface is substantially exposed, the pivotal mounting of said member permitting adjustment thereof with respect to said support to correspond with given bearings, a plurality of indicating elements cooperating with said member and its calibrations and adjustable with respect to said member and said support in a plane substantially parallel with said member, each of said indicating elements having dissimilar indicia presented by its opposite edges, said elements being arranged to have like edges in adjacency.

2. An indicating instrument for navigation comprising a support, a pivot secured to said support, a member rotatably mounted upon said pivot and having an angularly calibrated surface so positioned with respect to said support that said surface is substantially exposed, the rotatable mounting of said member permitting adjustment thereof with respect to said support to correspond with given bearings, a plurality of indicating elements independently adjustably mounted with respect to said member and said support, and means for clamping said member and said elements in adjusted position relative to their support.

3. An indicating instrument for navigation comprising a support, a member bearing a plurality of angularly disposed simultaneously exposed radial graduations rotatably mounted upon said support, said support carrying a bench mark indication for registry with graduations on said member, the rotatable mounting of said member permitting adjustment thereof with respect to said bench mark to indicate a given direction, a plurality of elements adjustably mounted with respect to said member and said support bearing distinguishing markings, and means for clamping said elements in registry with graduations on said member.

4. An indicating instrument for navigation comprising a support, a member bearing radial graduations rotatably mounted upon said support, the rotatable mounting of said member permitting adjustment thereof with respect to said support to correspond with given bearings, a plurality of indicators pivotally adjustable with respect to said member and said support for registration with selected graduations on said member, the graduations on said member being arranged in a simultaneously exposed plural series, the bases of one series being directed towards the center of rotation of said member, the bases of another series being directed away from the center of rotation of said member.

5. An indicating instrument for navigation comprising a support, an angularly calibrated member bearing a plurality of angularly disposed simultaneously exposed radial graduations pivotally mounted upon said support, the pivotal mounting of said member permitting adjustment thereof with respect to said support to correspond with given bearings, a plurality of indicating elements having portions overlying said member and adjustable with respect thereto and said support, said elements having cut-out portions for observation of said calibrations, and said elements bearing dissimilar indicia on their opposite edges.

6. An indicating instrument for navigation for cooperation with radio range beacons comprising a radially graduated plate having a plurality of indicators adjustable with respect thereto to represent the beams of a radio range beacon, an element adjustable with respect to said plate and said indicators for depicting the relative position of a landing field, and an arm pivotally carried by said element for representing landing direction.

7. An indicating instrument for cooperation with radio range beacons comprising a supporting element carrying a plate member bearing a plurality of angularly disposed simultaneously exposed radial calibrations rotatably mounted upon said supporting element, the rotatable mounting of said member permitting adjustment thereof with respect to said supporting element to correspond with given bearings, a plurality of indicators pivotally mounted with respect to said plate and said supporting element for adjustment in accordance with a plurality of bearings assigned to beams of a radio range beacon.

8. An indicating instrument for cooperation with radio range beacons comprising a support, a rotatable plate bearing simultaneously exposed angular calibrations and adjustable with respect to said support, the adjustability permitting movement of said plate to correspond with given bearings, a plurality of separately adjustable indicator elements movably mounted with respect to said plate and said support for reproducing angular bearings corresponding to those of a radio range beacon and means for clamping said elements to adjusted positions.

THOMAS E. HALPIN.